US011604683B2

(12) United States Patent
Sodani et al.

(10) Patent No.: US 11,604,683 B2
(45) Date of Patent: Mar. 14, 2023

(54) SYSTEM AND METHODS FOR TAG-BASED SYNCHRONIZATION OF TASKS FOR MACHINE LEARNING OPERATIONS

(71) Applicant: Marvell Asia Pte, Ltd. (Registration No. 199702379M), Singapore (SG)

(72) Inventors: Avinash Sodani, San Jose, CA (US); Gopal Nalamalapu, Santa Clara, CA (US)

(73) Assignee: Marvell Asia Pte Ltd, Singapore (SG)

(*) Notice: Subject to any disclaimer, the term of this patent is extended or adjusted under 35 U.S.C. 154(b) by 419 days.

(21) Appl. No.: 16/864,049

(22) Filed: Apr. 30, 2020

(65) Prior Publication Data

US 2021/0191787 A1 Jun. 24, 2021

Related U.S. Application Data

(60) Provisional application No. 62/950,745, filed on Dec. 19, 2019.

(51) Int. Cl.
*G06F 9/52* (2006.01)
*G06F 9/48* (2006.01)
*G06F 9/38* (2018.01)
*G06F 15/80* (2006.01)
*G06F 15/76* (2006.01)

(52) U.S. Cl.
CPC .............. *G06F 9/52* (2013.01); *G06F 9/3836* (2013.01); *G06F 9/4881* (2013.01); *G06F 15/80* (2013.01); *G06F 9/38* (2013.01); *G06F 15/76* (2013.01)

(58) Field of Classification Search
None
See application file for complete search history.

(56) References Cited

U.S. PATENT DOCUMENTS

2021/0165682 A1* 6/2021 Xiao ..................... G06F 9/52

* cited by examiner

*Primary Examiner* — Qing Yuan Wu

(57) ABSTRACT

A new approach for supporting tag-based synchronization among different tasks of a machine learning (ML) operation. When a first task tagged with a set tag indicating that one or more subsequent tasks need to be synchronized with it is received at an instruction streaming engine, the engine saves the set tag in a tag table and transmits instructions of the first task to a set of processing tiles for execution. When a second task having an instruction sync tag indicating that it needs to be synchronized with one or more prior tasks is received at the engine, the engine matches the instruction sync tag with the set tags in the tag table to identify prior tasks that the second task depends on. The engine holds instructions of the second task until these matching prior tasks have been completed and then releases the instructions to the processing tiles for execution.

21 Claims, 2 Drawing Sheets

200

```
┌─────────────────────────────────────────────────────────────┐
│ ACCEPT A FIRST TASK FOR A ML OPERATION, WHEREIN THE FIRST   │
│ TASK HAS A SET TAG, WHICH IS A NON-ZERO IDENTIFIER          │
│ INDICATING THAT ONE OR MORE SUBSEQUENT TASKS NEED TO BE     │
│ SYNCHRONIZED WITH THE FIRST TASK                            │
│                            202                              │
└─────────────────────────────────────────────────────────────┘
                              │
                              ▼
┌─────────────────────────────────────────────────────────────┐
│ SAVE THE SET TAG OF THE FIRST TASK TO A TAG TABLE           │
│ ASSOCIATED WITH AN INSTRUCTION STREAMING ENGINE             │
│                            204                              │
└─────────────────────────────────────────────────────────────┘
                              │
                              ▼
┌─────────────────────────────────────────────────────────────┐
│ TRANSMIT AND ROUTE INSTRUCTIONS OF THE FIRST TASK TO A SET  │
│ OF PROCESSING TILES TO BE EXECUTED BASED ON A DESTINATION   │
│ MASK OF THE FIRST TASK IF THE FIRST TASK DOES NOT HAVE AN   │
│ INSTRUCTION SYNC TAG                                        │
│                            206                              │
└─────────────────────────────────────────────────────────────┘
                              │
                              ▼
┌─────────────────────────────────────────────────────────────┐
│ ACCEPT A SECOND TASK FOR THE ML OPERATION, WHEREIN THE      │
│ SECOND TASK HAS AN INSTRUCTION SYNC TAG, WHICH IS A         │
│ NON-ZERO IDENTIFIER REFERRING TO A SET TAG ON A PRIOR TASK  │
│ THE SECOND TASK IS TO BE SYNCHRONIZED WITH                  │
│                            208                              │
└─────────────────────────────────────────────────────────────┘
                              │
                              ▼
┌─────────────────────────────────────────────────────────────┐
│ MATCH THE INSTRUCTION SYNC TAG OF THE SECOND TASK WITH      │
│ ENTRIES IN THE TAG TABLE                                    │
│                            210                              │
└─────────────────────────────────────────────────────────────┘
                              │
                              ▼
┌─────────────────────────────────────────────────────────────┐
│ HOLD INSTRUCTIONS OF THE SECOND TASK IF A MATCH IS FOUND    │
│ UNTIL THE MATCHING ENTRY IN THE TAG TABLE IS INVALIDATED    │
│ OR REMOVED, INDICATING THAT THE SYNCHRONIZATION WITH THE    │
│ PRIOR TASK THE SECOND TASK DEPENDS ON IS DONE               │
│                            212                              │
└─────────────────────────────────────────────────────────────┘
                              │
                              ▼
┌─────────────────────────────────────────────────────────────┐
│ RELEASE AND TRANSMIT THE INSTRUCTIONS OF THE SECOND TASK    │
│ TO A SET OF PROCESSING TILES TO BE EXECUTED BASED ON A      │
│ DESTINATION MASK OF THE SECOND TASK                         │
│                            214                              │
└─────────────────────────────────────────────────────────────┘
```

FIG. 2

SYSTEM AND METHODS FOR TAG-BASED SYNCHRONIZATION OF TASKS FOR MACHINE LEARNING OPERATIONS

CROSS-REFERENCE TO RELATED APPLICATIONS

This application claims the benefit of U.S. Provisional Patent Application No. 62/950,745, filed Dec. 19, 2019, and entitled "Tag based synchronization," which is incorporated herein in its entirety by reference.

BACKGROUND

A hardware-based machine learning (ML) system typically includes multiple cores/subsystems, each having its own processing units and on-chip memory (OCM) for executing ML applications/operations. A ML application typically includes multiple tasks, wherein each tasks may include a plurality of programmable instructions grouped and transmitted from a compiler to an instruction streaming engine and executed by the ML system to complete the task. Some of the tasks may be executed independently on the processing tiles without relying on other tasks to be executed, while some other tasks may have dependency on other tasks and can only be scheduled after the other tasks are executed by the processing tiles first. As such, scheduling of the tasks that have dependencies needs to be synchronized.

Currently, instructions of a task without dependency are sent to the processing tiles by the instruction streaming engine since no synchronization is required. For a task that does need synchronization (received with a synchronization flag, e.g., INS_Sync), the default mode of synchronization is for the instruction streaming engine to hold the instructions of the task and wait for all prior tasks that that came/scheduled before the task is executed first before sending the instructions of the current task to the processing tiles even if the current task does not depend on all of those prior tasks. Such synchronization process is considered heavy weight in terms of wait time taken for the current task to be executed and may result in performance loss since some of the processing tiles may be kept idle during the wait time.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support tag-based synchronization of processing tiles for machine learning according to one aspect of the present embodiments.

DETAILED DESCRIPTION

Figure 1:
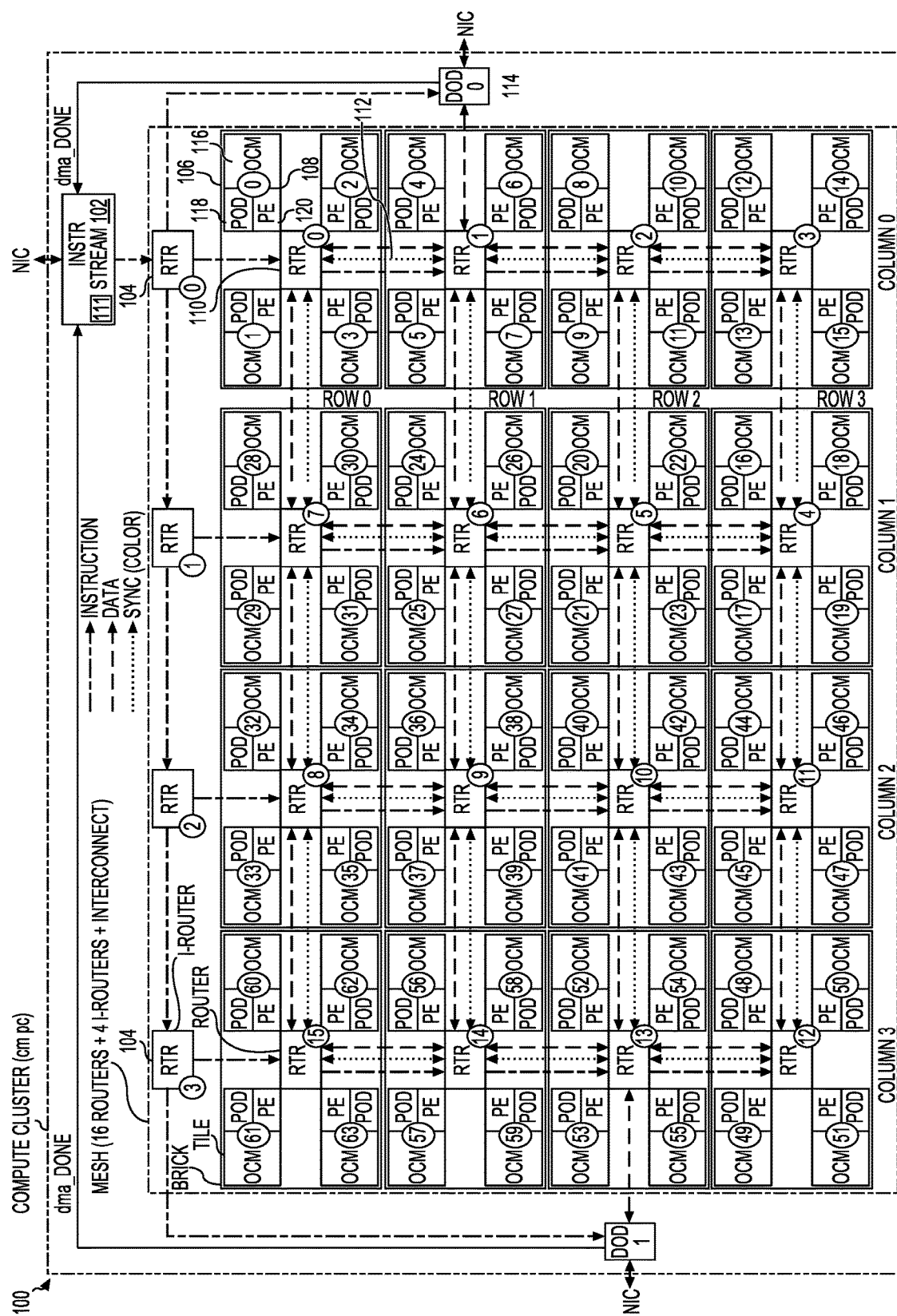
FIG. 1 depicts an example of a diagram of a hardware-based programmable architecture to support tag-based synchronization of processing tiles for machine learning according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support a tag-based synchronization scheme for fine-grained synchronization among different tasks of a machine learning (ML) operation/application. Specifically, when a first task tagged with a set tag indicating that one or more subsequent/later tasks need to be synchronized with the first task is received at an instruction streaming engine, the instruction streaming engine saves the set tag in a tag table and transmits instructions of the first task to a set of processing tiles for execution according to its destination mask. When a second task having an instruction sync tag indicating that the second task needs to be synchronized with one or more prior tasks is received at the instruction streaming engine, the instruction streaming engine matches the instruction sync tag with the set tags maintained in the tag table to identify one or more matching prior tasks that the second task depends on. The instruction streaming engine holds instructions of the second task until all these matching prior tasks have been completed. The instruction streaming engine then releases and transmits the instructions of the second task to the processing tiles for execution according to a destination mask of the second task.

Under the proposed tag-based synchronization approach, which addresses dependency among tasks, a task that needs to be synchronized with one or more prior tasks only needs to wait for those specific tasks it depends on to complete, thus eliminating the need to wait for all prior tasks that preceded it to complete. As a result, the wait time before the task can proceed to be executed by the processing tiles is reduced significantly. Such tag-based synchronization approach also increases utilization of the processing tiles as the idle time of the processing tiles between executing instructions of two tasks is reduced significantly.

FIG. 1 depicts an example of a diagram of a hardware-based programmable architecture 100 configured to support tag-based synchronization of processing tiles for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the architecture 100 includes an instruction streamer/streaming engine 102, a plurality of instruction routers 104s, and a plurality of processing bricks/blocks/nodes 106s arranged in a two-dimensional array of a plurality of rows and columns, e.g., 4×4 as shown in FIG. 1, wherein each processing brick 106 comprises a set of (e.g., four) processing tiles 108s connected or coupled to one another via a router 110 to form the processing brick 106. The architecture 100 further includes a plurality of bi-directional linkages/interconnects 112s that interconnect the instruction streaming engine 102, the instruction routers 104s, the routers 110s, as well as DODs (DDR-OCM DMAs) 114s together to form the architecture 100. Each of these components in the mesh architecture 100 is a dedicated hardware block/component programmable by a user at a host (not shown) through a PCIe interface via software instructions through the streaming engine 102 for various machine learning operations. When the software instructions are executed, each of the hardware components becomes a special purposed hardware component for practicing certain machine learning functions. In some embodiments, the mesh architecture 100 is on a single chip, e.g., a system-on-chip (SOC).

In some embodiments, each processing tile 108 further comprises at least an on-chip memory (OCM) 116, a first type of processing unit (e.g., POD) 118, and a second type of processing unit (e.g., PE) 120. Here, each OCM 116 in the processing tile 108 comprises one or more memory tiles/banks and is configured to accept and maintain data in a streaming fashion for local access by the processing units for various ML operations. In some embodiments, each POD 118 is configured to perform dense or regular computations on the data in the OCM 116, e.g., matrix operations such as matrix multiplication and manipulation. Each PE 120 is configured to perform sparse/irregular computations and/or complex data shape transformations of the data in the OCM 116 and/or from the POD 118. Each processing brick 106 and its processing tiles 108s can be programmed according to one or more programming instructions received from the instruction streaming engine 102.

In the example of FIG. 1, the architecture 100 includes three main independent networks for transmitting programming instructions from the instruction-streaming engine 102 to the processing bricks 106s and their processing tiles 108s, transmitting data packets from a memory unit (not shown) to the processing bricks 106s via the DODs 114 and among the processing bricks 106s, and for synchronizing operations of the processing tiles 108s. In some embodiments, the three different networks are physically separated and do not share any resource such as the interconnects 112s.

In the example of FIG. 1, the instruction streaming engine 102 is configured to receive/accept a ML task (or task) created by a complier running on a host (not shown), wherein the task comprises a set of programming instructions to be consumed by a set of processing bricks 106 and their processing tiles 108s for the task. In some embodiments, each task has an associated destination mask, wherein each bit in the destination mask represents a corresponding destination processing brick and/or processing tile the instructions of the task must be sent to for execution. If a bit in the destination mask is set to 1, the task is to be transmitted/distributed to the corresponding processing brick 106 or processing tile 108 for execution. In some embodiments, the destination mask is transferred with the instructions of the task by the instruction streaming engine 102.

In some embodiments, the current task received by the instruction streaming engine 102 comes with an associated set_tag, which is a non-zero identifier indicating that one or more subsequent tasks may depend on and thus need to be synchronized with the current task, e.g., those one or more subsequent tasks received after the current task have to wait for processing bricks 106 and their processing tiles 108s to finish executing the current task before the one or more subsequent tasks can proceed to be executed. In some embodiments, the set_tag is a user-specified multi-bit (e.g., 5-bit) number. Since the value of 0 means no tag, the set_tag needs to be a non-zero value to be a valid tag. In some embodiments, multiple tasks may share the same set_tag, indicating that these tasks may need to be synchronized with the same set of later tasks.

In some embodiments, each of the one or more later tasks received by the instruction streaming engine 102 has an instruction synchronization tag ins_sync_tag, which is a non-zero identifier referring to a tag set on a prior task (e.g., the current task) against which the later tasks are to be synchronized with. Like the set_tag, the ins_sync_tag needs to be a non-zero value to be a valid tag and the value of 0 means no tag. In some embodiments, a later task may need to be synchronized against multiple prior tasks having the same tag. Note that the ins_sync_tag is valid only if the associated task has a synchronization flag (e.g., INS_Sync) set (e.g., sync_bits are 11). If ins_sync_tag is 0 and the synchronization flag is set, the task is to be synchronized with the immediate prior task. In some embodiments, one task may possibly come with both set_tag and ins_sync_tag as the task may need to be synchronized with one or more prior tasks and also be dependent upon by later tasks at the same time. In some embodiments, both the set_tags and ins_sync_tags of the tasks are set by the compiler knowing the dependency among the tasks when the instructions of the tasks are being compiled.

In the example of FIG. 1, the instruction streaming engine 102 is configured to determine scheduling of a task as to when the instructions of the task are to be transmitted to and executed by the corresponding processing bricks 106s and tiles 108s according to the destination mask of the task. In some embodiments, the instruction streaming engine 102 is configured to maintain a tag table 111, which includes set_tags of all received tasks having set_tags and are being executed by their corresponding processing bricks 106s and processing tiles 108s. When a task having a non-zero set_tag is received, the instruction streaming engine 102 is configured to send a global synchronization message (e.g., global_sync) to the processing bricks and tiles for that task for global synchronization of the task as described below and insert the global_sync in the tag table 111. The instruction streaming engine 102 then saves the set_tag to a tag table 111 entry corresponding to the global_sync for synchronization with later tasks.

In some embodiments, once the set_tag has been saved in the tag table 111, the instruction streaming engine 102 is configured to transmit the instructions of the task (as well as the global_sync) horizontally to one or more instruction router 104s according to the destination mask of the task, wherein each of the one or more instruction routers 104s is positioned at a column of the two-dimensional array of processing bricks 106s and processing tiles 108s designated for the task. The one or more instruction routers 104s then transmit the instructions of the tasks vertically to the processing bricks 106s and processing tiles 108s at the corresponding rows according to the destination mask for processing. In some embodiments, once all of the processing bricks 106 and their processing tiles 108s designated by (and received) the global_sync are done executing the instructions of the ML task, one or more of the processing bricks 106 and/or its processing tiles 108 send a response (e.g., one bit representing each processing tile) to the instruction streaming engine 102, informing the instruction streaming engine 102 that execution of the ML task has been completed. When the responses from these processing bricks 106 and/or processing tiles 108s executing the instructions of the ML task have been received, the instruction streaming engine 102 invalidates or removes the set_tag of the task from the tag table since future tasks no longer need to be synchronized with the task. In some embodiments, one or more of the processing bricks 106 and/or processing tiles 108 is configured to monitor the rest of the processing bricks 106 and processing tiles 108 executing the same task and one of them is configured to respond back to the instruction streaming engine 102 when all of them are done executing the instructions of the task.

In some embodiments, when a task with a non-zero ins_sync_tag is received by the instruction streaming engine 102, the instruction streaming engine 102 first checks if the synchronization flag is set for the task (e.g., whether the corresponding sync_bits in the task are set to 11). If the synchronization flag is not set, the instruction streaming engine 102 then ignores the ins_sync_tag and flags a non-fatal error for the task. If the synchronization flag is set, the instruction streaming engine 102 is configured to check entries in tag table 111 for any tag(s) that matches the ins_sync_tag of the task. If there is no match, the task does not require synchronization with any prior task and the instruction streaming engine 102 proceeds to transmit the instructions of the task to its corresponding bricks 106 and processing tiles 108s for execution as described above because the prior task that the current task depends on has been completed and its tag removed from the tag table 111. If there is a match, which indicates that the prior task(s) the current task depends on are still being executed by the corresponding processing bricks 106s and processing tiles 108s, the instruction streaming engine 102 is configured to hold the instructions of the task (instead of transmitting the instructions to the instruction routers 104s) until the corresponding/matching entry in the tag table 111 is invalidated or removed, indicating that the synchronization with the prior task(s) the current task depends on is done. Note that there can be multiple entries in the tag table 111 that match with the ins_sync_tag of the task. In that case, the instruction streaming engine 102 holds the instructions of the task until all of the matching entries in the tag table 111 are invalidated or removed. In the case where the synchronization flag is set but ins_sync_tag is zero, the task is treated as a standard ins_sync task and the instruction streaming engine 102 is configured to hold the instructions of the task until its immediate prior task is completed. For tasks that have both set_tag and ins_sync_tag set, the ins_sync_tag takes precedence over set_tag because ins_sync_tag requires pre-task operation, e.g., the prior tasks need to be done first, while set_tag requires only post-task operation.

The following is a non-limiting example illustrating operations of the architecture 100 for tag-based synchronization of tasks. In the non-limiting example, a task #3 is received by the instruction streaming engine 102, wherein task #3 has a set_tag (e.g., 20) indicating that it is needed later by a different task #11 that depends on it. The instruction streaming engine 102 saves the set_tag 20 of task #3 to tag table 111 and transmits instructions of task #3 to a set of processing bricks 106s and tiles 108 for execution via a set of instruction routers 104 according to the destination mask of task #3. When task #11 having an ins_sync_tag (e.g., 20) is received by the instruction streaming engine 102, the instruction streaming engine searches the tag table 111 to see there is an entry matching the ins_sync_tag. If task #3 has been completed by processing bricks 106s and tiles 108 by then, its corresponding entry in the tag table would have been cleared/removed and no match in the tag table 111 is found, indicating that task #3, which task 11 depends on, has been executed and completed. As such, task #11 can be sent to its corresponding processing bricks 106s and tiles 108 for execution. If task #3 has not been completed by its processing bricks 106s and tiles 108, a match in the tag table 111 will be found indicating that task #3 is still being processed. As a result, the instructions of task #11 are held by instruction streaming engine 102 until a clear signal for task #3 is received. In the meantime, other processing bricks 106s and tiles 108 may execute other tasks that do not depend on task #3. As such, task #11 only needs to wait for task #3 to complete (instead of all prior tasks #1-10 received by the instruction streaming engine 102 before it). Consequently, tile utilization is maximized and the amount of waiting and processing time for each task is reduced because the need to wait until all processing tiles are idle when a dependency is encountered is eliminated.

Use Case

One non-limiting example of use case for tag-based synchronization of tasks discussed above is to synchronize between two direct memory access requests/points (DMAs) where the second DMA is reusing the same memory region used by the first DMA. In this case, the second DMA needs to wait until the tasks using the data of the first DMA are done. Without tag-based synchronization, the second DMA will have to do heavy-weight INS_Sync right before itself, wherein the INS_Sync will hard synchronize and wait for all tasks of the entire compute cluster to complete even though the tasks using the first DMA may long be done. Any amount of separation between the last usage of the first DMA and the second DMA will not help remove this INS_Sync right before the second DMA. This case may happen because software will be reusing the OCM space between different layers for weights and activation. If the hard INS_Sync is needed to ensure that a later DMA does not overwrite the previous data before they are completely used, then almost every DMA will need to be preceded with an INS_Sync, which makes overlapping DMA with previous tasks impossible. With tagged based synchronization, the last use of the first DMA can be assigned a tag and synchronized with the second DMA based on that tag. Other tasks can also be scheduled between the two DMA points so by the time the second DMA is encountered, the likelihood is that the last usage of the first DMA is done. This will ensure that a hard INS_Sync is not needed right before the second DMA.

FIG. 2 depicts a flowchart 200 of an example of a process to support tag-based synchronization of processing tiles for machine learning. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a first task for a ML operation is received by an instruction streaming engine, wherein the first task have a set tag, which is a non-zero identifier indicating that one or more subsequent tasks need to be synchronized with the first task. The flowchart 200 continues to block 204, where the set tag of the first task is saved to a tag table associated with the instruction streaming engine. The flowchart 200 continues to block 206, where instructions of the first task are transmitted by the instruction streaming engine and routed to a set of processing tiles to be executed based on a destination mask of the first task if the first task does not have an instruction sync tag. The flowchart 200 continues to block 208, where a second task for the ML operation is received by the instruction streaming engine, wherein the second task has an instruction sync tag, which is a non-zero identifier referring to a set tag on a prior task the second task is to be synchronized with. The flowchart 200 continues to block 210, where the instruction sync tag of the second task is matched with entries in the tag table. If a match is found, the flowchart 200 continues to block 212, where instructions of the second task are held by the instruction streaming engine until the matching entry in the tag table is invalidated or removed, indicating that the synchronization with the prior task the second task depends on is done. The flowchart 200 ends at block 214, wherein the instructions of the second task are released by the instruction streaming engine and transmitted to a set of processing tiles to be executed based on a destination mask of the second task.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based programmable architecture to support tag-based synchronization for machine learning (ML), comprising:
    a plurality of processing blocks arranged in a two-dimensional array of a plurality of rows and columns, wherein each of the plurality of processing blocks comprises a plurality of processing tiles connected to one another; and
    an instruction streaming engine configured to
        accept a first task for a ML operation, wherein the first task has a set tag, which is a non-zero identifier indicating that one or more subsequent tasks need to be synchronized with the first task;
        save the set tag of the first task to a tag table associated with the instruction streaming engine;
        transmit and route instructions of the first task to a set of processing tiles to be executed based on a destination mask of the first task if the first task does not have an instruction sync tag;
        accept a second task for the ML operation, wherein the second task has an instruction sync tag, which is a non-zero identifier referring to a set tag on a prior task the second task is to be synchronized with;
        match the instruction sync tag of the second task with entries in the tag table;
        hold instructions of the second task if a match is found until the matching entry in the tag table is invalidated or removed, indicating that the synchronization with the prior task the second task depends on is done; and
        release and transmit the instructions of the second task to a set of processing tiles to be executed based on a destination mask of the second task.

2. The hardware-based programmable architecture of claim 1, further comprising:
    a plurality of instruction routers each associated with one of the columns of the processing blocks, wherein each of the plurality of instruction routers is configured to
        receive the instructions transmitted horizontally from the instruction streaming engine; and
        route the received instructions vertically to the processing tiles at different rows in the column.

3. The processing unit of claim 1, wherein:
    each of the processing tiles further comprises:
        an on-chip memory (OCM) comprising one or more memory tiles configured to accept and maintain data for access by one or more processing units for the ML operation;
        said one or more processing units include
            a first processing unit configured to perform dense or regular computations on the data in the OCM; and
            a second processing unit configured to perform sparse/irregular computations and/or complex data shape transformations of the data in the OCM and/or from the first processing unit.

4. The hardware-based programmable architecture of claim 1, wherein:
    each bit in the destination masks represents a corresponding destination processing tile associated with executing the instructions of the first or the second task.

5. The hardware-based programmable architecture of claim 1, wherein:
    one of the first or second tasks has both a set tag and an instruction sync tag, indicating that the one of the first or the second tasks needs to be synchronized with one or more prior tasks and be depended upon by one or more later tasks at the same time.

6. The hardware-based programmable architecture of claim 5, wherein:
    the instruction sync tag takes precedence over the set tag when the one of the first or second tasks has both the set tag and the instruction sync tag.

7. The hardware-based programmable architecture of claim 1, wherein:
    a plurality of first tasks share the same set tag, indicating that these tasks are to be synchronized with a same set of later tasks.

8. The hardware-based programmable architecture of claim 1, wherein:
    the instruction sync tag of the second task matches with more than one set tag in the tag table.

9. The hardware-based programmable architecture of claim 8, wherein:
    the instruction streaming engine is configured to hold the instructions of the second task until all matching entries in the tag table are invalidated or removed, indicating that the synchronization with all prior tasks the second task depends on is done.

10. The hardware-based programmable architecture of claim 1, wherein:
    the instruction streaming engine is configured to send a global synchronization message to the set of processing tiles for the first task according to the destination mask of the first task for global synchronization of the first task.

11. The hardware-based programmable architecture of claim 1, wherein:
the set of processing tiles executing the instructions of the first task are configured to send a response to inform the instruction streaming engine that execution of the instructions of the first task has been completed.

12. The hardware-based programmable architecture of claim 11, wherein:
the instruction streaming engine is configured to remove the set tag of the first task from the tag table when responses from the set of processing tiles executing the instructions of the first task have been received.

13. The hardware-based programmable architecture of claim 11, wherein:
one or more of the processing tiles executing the instructions of the first task are configured to monitor other processing tiles of the one or more processing tiles executing the first task, wherein one processing tile of the one or more processing tiles is configured to respond back to the instruction streaming engine when all of the one or more processing tiles associated with execution of the instructions for the first task are done with executing the instructions of the first task.

14. The hardware-based programmable architecture of claim 1, wherein:
the instruction streaming engine is configured to transmit the instructions of the second task to its corresponding processing tiles for execution responsive to a mismatch, indicating that the second task does not require synchronization with any prior tasks.

15. A method to support tag-based synchronization for machine learning (ML), comprising:
accepting a first task for a ML operation, wherein the first task has a set tag, which is a non-zero identifier indicating that one or more subsequent tasks need to be synchronized with the first task;
saving the set tag of the first task to a tag table associated with an instruction streaming engine;
transmitting and routing instructions of the first task to a set of processing tiles to be executed based on a destination mask of the first task if the first task does not have an instruction sync tag;
accepting a second task for the ML operation, wherein the second task has an instruction sync tag, which is a non-zero identifier referring to a set tag on a prior task the second task is to be synchronized with;
matching the instruction sync tag of the second task with entries in the tag table;
holding instructions of the second task if a match is found until the matching entry in the tag table is invalidated or removed, indicating that the synchronization with the prior task the second task depends on is done; and
releasing and transmitting the instructions of the second task to a set of processing tiles to be executed based on a destination mask of the second task.

16. The method of claim 15, further comprising:
holding the instructions of the second task until all matching entries in the tag table are invalidated or removed, indicating that the synchronization with all prior tasks the second task depends on is done, when the instruction sync tag of the second task matches with more than one set tag in the tag table.

17. The method of claim 15, further comprising:
sending a global synchronization message to the set of processing tiles for the first task according to the destination mask of the first task for global synchronization of the first task.

18. The method of claim 15, further comprising:
sending a response by the set of processing tiles executing the instructions of the first task to inform the instruction streaming engine that execution of the instructions of the first task has been completed.

19. The method of claim 18, further comprising:
removing the set tag of the first task from the tag table when responses from the set of processing tiles executing the instructions of the first task have been received since future tasks no longer need to be synchronized with the first task.

20. The method of claim 18, further comprising:
monitoring other processing tiles executing the first task by one or more of the processing tiles executing the instructions of the first task, wherein one processing tile of the one or more processing tiles is configured to respond back to the instruction streaming engine when all processing tiles of the one or more processing tiles associated with execution of the instructions for the first task are done with executing the instructions of the first task.

21. The method of claim 15, further comprising:
transmitting the instructions of the second task to its corresponding processing tiles for execution responsive to a mismatch, indicating that the second task does not require synchronization with any prior tasks.

* * * * *